3,002,974
PREPARATION OF 8-CHLOROALLOXAZINE

Harold G. Petering, Kalamazoo, Mich., assignor to The Upjohn Company, Kalamazoo, Mich., a corporation of Delaware
No Drawing. Filed July 9, 1959, Ser. No. 825,898
8 Claims. (Cl. 260—251.5)

This invention relates to a process for the preparation of 8-chloroalloxazine substantially free from impurities.

We have found that 8-chloroalloxazine possesses marked diuretic activity whereas certain impurities, to be described hereinafter, which are produced as byproducts in the synthesis thereof, possess much less diuretic activity. 8-chloroalloxazine has the following structure:

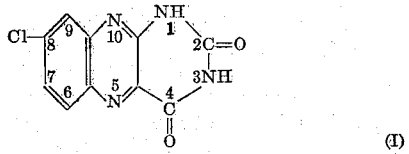

(I)

[The system of numbering of the positions in the alloxazine molecule employed throughout this specification is that adopted by Chemical Abstracts.]

Accordingly it is desirable that any method employed for the synthesis of 8-chloroalloxazine for therapeutic purposes should be capable of yielding the latter compound substantially free from less active impurities. It is an object of the present invention to provide a process for the synthesis of 8-chloroalloxazine which meets these requirements. Other objects of the invention will be apparent to those skilled in the art.

The synthesis of 8-chloroalloxazine in substantially pure form has not been described previously. Wolf et al., J. Amer. Chem. Soc. 70, 2572–4 (1948), have reported the preparation of a chloroalloxazine by the reaction of 4-chloro-1,2-phenylenediamine with alloxan in aqueous hydrochloric acid solution. It will be seen from the following equations that the reaction of alloxan and the above diamine is theoretically capable of giving rise to either 7- or 8-chloroalloxazine.

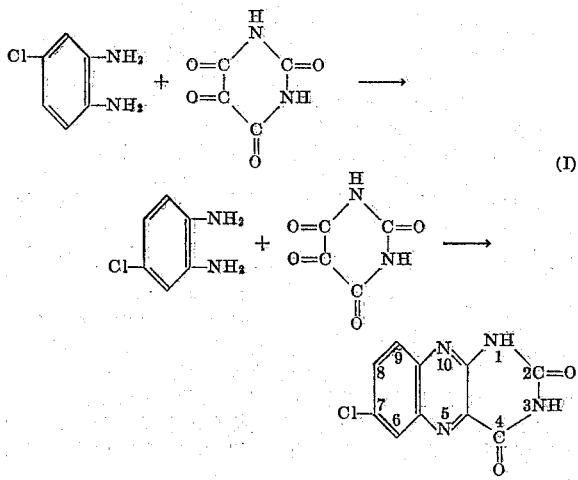

The above authors did not identify precisely the product which they obtained but indicated only that it was either the 7- or 8-isomer; no physical characteristics were given for the product except that it did not melt when heated at 360 degrees [centigrade], and no analysis was given. We have repeated the procedure described by the above authors and have shown that the product obtained is a mixture of 8-chloroalloxazine and a number of impurities, the chief of which is 6-chloro-1,2-dihydro-2-keto-3-carboxy-quinoxaline ureide having the formula:

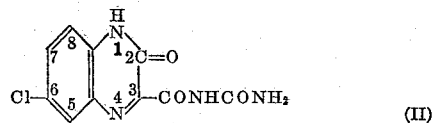

(II)

We have been unable to detect the presence of 7-chloroalloxazine in the reaction product obtained using the above procedure or procedures to be described hereinafter.

We have now found that, by employing certain critical conditions in the reaction of 4-chloro-1,2-phenylenediamine with alloxan, it is possible to obtain, as the main product, 8-chloroalloxazine substantially free from the ureide (II) and other impurities.

The term "8-chloroalloxazine substantially free from impurities" as used in this specification means 8-chloroalloxazine which, when subjected to paper chromatographic analysis, shows no evidence of the presence of the ureide (II) and other impurities. 8-chloroalloxazine can be separated readily from the ureide (II) using circular paper chromatography with a solvent system composed of 6 parts by volume of n-butanol, 4 parts by volume of pyridine and 3 parts by volume of water. In this solvent system the ureide (II) and 8-chloroalloxazine have Rf values of 0.80 and 0.88 respectively. Another suitable solvent system consists of 83 parts by volume of n-butanol, 15 parts by volume of water and 2 parts by volume of piperidine. In this solvent system the ureide (II) and 8-chloroalloxazine have Rf values of 0.70 and 0.60 respectively. Both the ureide and the alloxazine are easily detected on the chromatogram since they fluoresce when illuminated with ultraviolet light. Using usch chromatographic conditions it is possible to detect amounts of the ureide (II) as low as the order of 1 percent in admixture with 8-chloroalloxazine.

The process of the invention comprises the reaction of 4-chloro-1,2-phenylenediamine with alloxan in the presence of glacial acetic acid and not less than about a 0.03 molar proportion (3 molar percent) of boric acid based on alloxan present in the reaction mixture, whereby there is produced 8-chloroalloxazine substantially free from impurities.

The critical factors, which determine the formation of 8-chloroalloxazine in the required degree of purity, are (a) the presence of boric acid in amounts equal to or above the limit defined above, and (b) the use of an anhydrous solvent medium containing glacial acetic acid. If the reaction is carried out in the presence of boric acid in an amount less than about 3 molar percent based on the alloxan present, significant amounts of the ureide (II) are produced. The proportion of the ureide which is produced increases as the amount of boric acid decreases. The upper limit of concentration of boric acid which can be present in the reaction mixture is dictated solely by considerations of economical operation and ease of handling the reaction mixture. Thus, amounts of boric acid substantially in excess of the lower limit defined above do not give any advantage as far as yield and quality of the product are concerned. For practical purposes, the amount of boric acid which it is desirable to use in the process of the invention is within the range of about 0.03 to about 1.5 molar proportions based on the alloxan present in the reaction mixture.

It is to be noted that Kuhn and Weygand, Berichte 68, 1282 (1935), and subsequent workers have shown that the yield of flavins (isoalloxazines), produced by the condensation of alloxan and N-substituted-1,2-phenylenediamines, can be increased considerably by including boric acid in the reaction mixture. However, it has not been suggested previously that the use of boric acid has any influence on the nature of the product formed in such a condensation, that is to say, that the use of boric acid can so influence the reaction that only one of two possible products will be produced. Such a finding is both novel and unexpected in the art.

The presence of glacial acetic acid in the reaction medium is an equally critical requirement of the process of the invention. Thus if the reaction between alloxan and the diamine is carried out in the presence of boric acid but in the absence of acetic acid, for example, in water, alcohol or acetone, the reaction product contains significant quantities of the undesired ureide (II). Further, the acetic acid employed in the process of the invention should be substantially anhydrous. The use of acetic acid containing more than about 2 percent by volume of water, gives a product which contains substantial amounts of the undesired ureide (II). Accordingly the acetic acid employed in the process of the invention must contain less than about 2 percent by volume of water, advantageously less than 1 percent of water and preferably should be anhydrous, i.e. glacial acetic acid. The acetic acid should preferably be present in the reaction mixture in an amount considerably in excess of equimolar proportions based on the alloxan present. Desirably the acetic acid should be present in at lease a 50 molar proportion based on the alloxan present and preferably within the range of 50 to 300 molar proportions. When this quantity of acetic acid is present the small amount of water which is liberated in the reaction between the alloxan and the diamine does not dilute the acetic acid to a significant extent.

If desired, the acetic acid can be diluted with an inert non-aqueous organic solvent which does not itself influence the course of the reaction. Suitable such solvents include methyl Cellosolve, Cellosolve, and butyl Cellosolve (the methyl, ethyl and butyl ethers, respectively, of ethyene glycol) and methyl Carbitol, Carbitol, and butyl Carbitol (the methyl, ethyl, and butyl ethers, respectively, of diethylene glycol) and the like.

The relative proportions of alloxan and 4-chloro-1,2-phenylenediamine which can be employed in the process of the invention can be varied over a wide range. However, it is preferable that the proportions of the reactants be substantially equimolar.

The process of the invention can be carried out over a wide range of temperatures without influencing significantly the yield and purity of the desired reaction product. Thus the reaction can be effected at temperatures within the range of about 15° C. to about 100° C., the speed of the reaction increasing as the temperature is raised. The reaction is most conveniently conducted at room temperature, that is to say, within the range of about 15 to about 25° C. Generally speaking, the reaction is complete within about 1 hour at temperatures of the order of 80° C.

The process of the invention can be carried out in a convenient manner, observing the above requirements as to proportions of reactants, etc., by mixing the alloxan (usually in the form of its monohydrate), 4-chloro-1,2-phenylenediamine, boric acid and glacial acetic acid, in any order, and maintaining the mixture at the desired temperature, preferably with constant stirring, for the required period of time. The 8-chloroalloxazine separates from the reaction mixture as a solid and can be recovered readily by filtration or by centrifugation. The product so isolated is generally in a high state of purity and requires no further treatment. If desired, however, the product can be recrystallized from a suitable solvent such as methyl Cellosolve.

The following examples are illustrative of the process of the present invention, but are not to be construed as limiting.

EXAMPLE 1

A. *Preparation of 4-chloro-1,2-phenylenediamine*

A portion of 500 ml. of Raney nickel catalyst was washed by slurrying with three 500-ml. portions of absolute alcohol, followed by three 500-ml. portions of ethyl acetate. The solvent washings were discarded. The washed catalyst was transferred, as a slurry in ethyl acetate, to a 5 gallon autoclave, and ethyl acetate was added to make the total volume 11.25 liters. To the catalyst suspension was added 750 g. (4.4 moles) of 4-chloro-2-nitroaniline. The autoclave was sealed, flushed with nitrogen and with hydrogen under pressure and then agitated at room temperature under a pressure of 50 p.s.i. of hydrogen. The reaction was exothermic and the agitation was interrupted periodically to control the temperature which was maintained at 25 to 30° C. throughout. After the reaction was known to be under control (about 10 minutes), the agitation was continued for a further hour. The autoclave was then vented and flushed three times with nitrogen under a pressure of 50 p.s.i. The contents of the autoclave were removed and filtered, and the autoclave and catalyst were washed with 3 liters of ethyl acetate. The combined filtrate and washings were evaporated at 45 to 55° C. under reduced pressure. There was thus obtained 600 g. (95.6 percent yield) of 4-chloro-1,2-phenylenediamine in the form of a colorless crystalline solid which was employed without further purification in the reaction described below.

B. *Preparation of 8-chloroalloxazine*

To a solution of 600 g. (4.2 moles) of 4-chloro-1,2-phenylenediamine (prepared as described above) in 7.8 liters (161.8 moles) of glacial acetic acid, was added 354 g. (5.72 moles) of powdered boric acid and 710 g. (4.43 moles) of powdered alloxan monohydrate, the solids being rinsed into the reaction vessel with 4.5 liters (93.37 moles) of glacial acetic acid. The reaction mixture was stirred and maintained at room temperature (approximately 20° C.) for a period of 3 days. The solid which had separated was isolated by filtration, approximately 2 liters of glacial acetic acid being used to rinse the product from the reaction vessel. The precipitate was drained as dry as possible on the filter, washed with 3.785 liters of Skellysolve B (a mixture of hexanes) and suspended in 11.5 liters of deionized water. The suspension was stirred and heated on a steam bath for 2 hours, before being cooled to room temperature and filtered. The precipitate was sucked as dry as possible on the filter and was suspended in 11.5 liters of absolute alcohol. The suspension was stirred and heated to the boiling point on a steam bath. The mixture was cooled to room temperature and filtered. The precipitate was sucked as dry as possible on the filter and then dried to constant weight at 60° C. under reduced pressure. There was thus obtained 990 g. (86.0 percent yield based on 4-chloro-1,2-phenylenediamine) of 8-chloroalloxazine in the form of a solid having a melting point of 329 to 331° C. The ultraviolet absorption spectrum of the compound (in solution in 0.1 N aqueous sodium hydroxide) exhibited maxima at 262, 335, 370 and 425 millimicrons.

*Analysis.*—Calcd. for $C_{10}H_5ClN_4O_2$: C, 48.30; H, 2.03; Cl, 14.26; N, 22.54. Found: C, 48.20; H, 2.29; Cl, 14.65; N, 22.54.

The 8-chloroalloxazine prepared as described above showed no evidence of traces of the ureide (II) when subjected to circular paper chromatography using a solvent system composed of 6 parts by volume of n-butanol, 4 parts by volume of pyridine and 3 parts by volume of water.

EXAMPLE 2

A series of experiments was performed in which 0.01 molar amounts of alloxan monohydrate and 4-chloro-1,2-phenylenediamine were condensed in glacial acetic acid solution in the presence of amounts of boric acid ranging from a 0.01 molar amount down to zero. The molar amounts of the reactants are shown in the following Table I.

TABLE I

| Reactant | Amount of reactant in moles | | | | | |
|---|---|---|---|---|---|---|
| | A | B | C | D | E | F |
| Alloxan monohydrate | 0.01 | 0.01 | 0.01 | 0.01 | 0.01 | 0.01 |
| 4-chloro-1,2-phenylene-diamine | 0.01 | 0.01 | 0.01 | 0.01 | 0.01 | 0.01 |
| Boric acid | 0.01 | 0.003 | 0.001 | 0.0003 | 0.0001 | 0.0 |
| Glacial acetic acid | 0.527 | 0.527 | 0.527 | 0.527 | 0.527 | 0.527 |

In each experiment the alloxan monohydrate was dissolved in the glacial acetic acid and to the solution was added the boric acid and the 4-chloro-1,2-phenylenediamine in powdered form. The reaction mixture was heated to 40° C. and maintained at this temperature, with stirring, for 1 hour. The mixture was then stirred at room temperature (approximately 20° C.) for a further three hours and allowed to stand at room temperature overnight. The solid which had separated was isolated by filtration, washed successively with glacial acetic acid, hot water, and alcohol, and dried. The crystalline products so obtained from each of the experiments A, B, C, D, E, and F were subjected to circular paper chromatography using a solvent system comprising 6 parts by volume of n-butanol, 4 parts by volume of pyridine and 3 parts by volume of water. By this means the products from experiments A, B, and C were shown to be pure 8-chloroalloxazine free from any trace of the ureide (II). The product from experiment D was found to be 8-chloroalloxazine containing a trace of ureide (II). The product from experiment E was found to be composed of approximately 5 parts by weight of 8-chloroalloxazine and 1 part by weight of ureide (II). The product from experiment F was found to be composed of approximately equal parts of 8-chloroalloxazine and the ureide (II). The melting points of the crystalline solids isolated from the six experiments were as follows.

Experiment:     Melting point of product, ° C.
A ---------------------------------- 333–335
B ---------------------------------- 333–335
C ---------------------------------- 333–335
D ---------------------------------- 310–320
E ---------------------------------- 295–305
F ---------------------------------- 249–250

The above experiments indicate that traces of ureide (II) are present in the 8-chloroalloxazine isolated from the reaction mixture when the amount of boric acid employed is only 3 molar percent based on the amount of alloxan and 4-chloro-1,2-phenylenediamine and that substantial amounts of ureide (II) are present in the 8-chloroalloxazine isolated from reaction mixtures containing less than the above amount of boric acid.

EXAMPLE 3

A series of four experiments was performed in which alloxan monohydrate and 4-chloro-1,2-phenylenediamine were condensed, with and without boric acid in the reaction medium, and using as solvent either methyl Cellosolve or a mixture of methyl Cellosolve and glacial acetic acid. The quantities of reactants employed in the experiments are shown in Table II, the figures in parentheses after the quantities representing amounts of the reactants expressed in millimoles.

TABLE II

| Reactant | Amount of reactant | | | |
|---|---|---|---|---|
| | A | B | C | D |
| Alloxan monohydrate | 85 mg. (0.5). | 85 mg. (0.5). | 85 mg. (0.5). | 85 mg. (0.5). |
| 4-chloro-1,2-phenylenediamine | 71 mg. (0.5). | 71 mg. (0.5). | 71 mg. (0.5). | 71 mg. (0.5). |
| Boric acid | 0.0 | 50 mg. (1.6). | 50 mg. (1.6). | 0.0. |
| Glacial acetic acid | 0.0 | 0.0 | 10 ml. | 10 ml. |
| Methyl Cellosolve | 33 ml. | 30 ml. | 20 ml. | 20 ml. |

In each experiment the boric acid and 4-chloro-1,2-phenylenediamine in powdered form were added to a solution of the alloxan monohydrate in the solvent (methyl Cellosolve or a mixture of methyl Cellosolve and glacial acetic acid). The resulting mixture was maintained at approximately 80° C. with stirring for a period of 1.75 hours. The mixture was then allowed to stand overnight at room temperature (approximately 20° C.) and finally maintained at 0° C. for several hours. The crystalline solid which had separated was isolated by filtration, washed successively with glacial acetic acid, hot water, and alcohol, and dried. The crystalline products so obtained from each of experiments A, B, C, and D were subjected to circular paper chromatography using a solvent system comprising 6 parts by volume of n-butanol, 4 parts by volume of pyridine and 3 parts by volume of water. By this means it was shown that the products from experiments A, B, and D consisted of 8-chloroalloxazine contaminated with substantial amounts of the ureide (II) whereas the product from experiment C was 8-chloroalloxazine free from any trace of ureide (II). Hence, it will be seen that the presence of both boric acid and acetic acid in the reaction mixture is essential for the preparation of 8-chloroalloxazine free from the ureide (II). Provided that both these components are present, a second solvent, in the above case methyl Cellosolve, can be employed.

I claim:

1. A process for the preparation of 8-chloroalloxazine substantially free from impurities, which comprises reacting 4-chloro-1,2-phenylenediamine with alloxan in an anhydrous medium containing acetic acid and not less than about 3 molar percent of boric acid based on the alloxan present in the reaction mixture.

2. The process of claim 1 in which the 4-chloro-1,2-phenylenediamine and the alloxan are present in approximately equimolar amounts.

3. The process of claim 1 in which the boric acid is present in an amount within the range of about 3 and about 150 molar percent based on the alloxan present in the reaction mixture.

4. The process of claim 1 in which there is also present in the reaction mixture a non-aqueous inert organic solvent.

5. The process of claim 1 in which the reaction is carried out at a temperature between about 15° C. and about 100° C.

6. The process of claim 5 in which the reaction is carried out at a temperature between about 15° C. and about 25° C.

7. The process of claim 3 in which the amount of acetic acid present in the reaction mixture is at least fifty times the amount of alloxan on a molar basis.

8. A process for the preparation of 8-chloroalloxazine substantially free from impurities, which comprises reacting substantially equimolar proportions of alloxan and 4-chloro-1,2-phenylenediamine, in the presence of glacial acetic acid and at least 3 molar percent of boric acid, based on the alloxan present in the reaction mixture, at a temperature within the range of about 15 to about 100° C. for a period of about 1 to about 72 hours, and isolating the solid which is precipitated.

References Cited in the file of this patent

UNITED STATES PATENTS 2,238,874    Kuhn et al. _____ Apr. 15, 1941

OTHER REFERENCES

Elderfield: Heterocyclic Compounds, vol. 6 (1957), pages 309–10.

Wolf et al.: J. Am. Chem. Soc., vol. 70 (1948), pages 2572–4.